US010466710B2

(12) United States Patent
Biber et al.

(10) Patent No.: US 10,466,710 B2
(45) Date of Patent: Nov. 5, 2019

(54) AUTONOMOUS WORK DEVICE

(71) Applicant: Robert Bosch GmbH, Stuttgart (DE)

(72) Inventors: Peter Biber, Poltringen (DE); Klaus Marx, Stuttgart (DE); Steffen Petereit, Freiberg A. N. (DE); Stefan Hensel, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 318 days.

(21) Appl. No.: 15/321,973

(22) PCT Filed: Jun. 3, 2015

(86) PCT No.: PCT/EP2015/062403
§ 371 (c)(1),
(2) Date: Dec. 23, 2016

(87) PCT Pub. No.: WO2015/197332
PCT Pub. Date: Dec. 30, 2015

(65) Prior Publication Data
US 2017/0127608 A1 May 11, 2017

(30) Foreign Application Priority Data

Jun. 27, 2014 (DE) .................. 10 2014 212 408

(51) Int. Cl.
*A01D 34/00* (2006.01)
*G05D 1/02* (2006.01)
(Continued)

(52) U.S. Cl.
CPC ......... *G05D 1/0225* (2013.01); *A01D 34/008* (2013.01); *B60L 53/30* (2019.02);
(Continued)

(58) Field of Classification Search
CPC ............. A01D 34/008; A01D 2101/00; G05D 1/0225; G05D 1/0255; G05D 2201/0208; G05D 1/0234
See application file for complete search history.

(56) References Cited

U.S. PATENT DOCUMENTS

2004/0158354 A1\* 8/2004 Lee ...................... G05D 1/0225
700/245
2004/0210346 A1 10/2004 Lee et al.
(Continued)

FOREIGN PATENT DOCUMENTS

CA 2 317 533 A1 7/1999

OTHER PUBLICATIONS

International Search Report corresponding to PCT Application No. PCT/EP2015/062403, dated Sep. 7, 2015 (German and English language document) (7 pages).

*Primary Examiner* — Dale Moyer
(74) *Attorney, Agent, or Firm* — Maginot, Moore & Beck LLP

(57) ABSTRACT

An autonomous implement includes at least one orientation device configured to provide an orientation within a processing zone. The at least one orientation device is different from a perimeter-wire orientation device. The autonomous implement further includes at least one control and/or regulating unit configured to ascertain a travel strategy. The at least one control and/or regulating unit is configured at least to ascertain an alignment relative to a base station for a targeted docking onto an interface of the base station based on at least one orientation parameter captured using the at least one orientation device.

14 Claims, 4 Drawing Sheets

(51) Int. Cl.
*B60L 53/30* (2019.01)
*B60L 53/35* (2019.01)
*B60L 53/36* (2019.01)

(52) U.S. Cl.
CPC ............... *B60L 53/35* (2019.02); *B60L 53/36* (2019.02); *G05D 1/0255* (2013.01); *A47L 2201/022* (2013.01); *A47L 2201/04* (2013.01); *B60L 2200/40* (2013.01); *G05D 2201/0208* (2013.01); *Y02T 10/7005* (2013.01); *Y02T 10/7072* (2013.01); *Y02T 90/121* (2013.01); *Y02T 90/125* (2013.01); *Y02T 90/14* (2013.01)

(56) References Cited

U.S. PATENT DOCUMENTS

| | | | |
|---|---|---|---|
| 2005/0156562 A1 | 7/2005 | Cohen et al. | |
| 2007/0050086 A1 | 3/2007 | Lim et al. | |
| 2008/0004751 A1* | 1/2008 | Chung | G05D 1/0225 700/258 |
| 2008/0049217 A1 | 2/2008 | Cappelletti | |
| 2011/0234153 A1 | 9/2011 | Abramson | |
| 2012/0265391 A1 | 10/2012 | Letsky | |
| 2012/0323365 A1 | 12/2012 | Taylor et al. | |
| 2013/0214726 A1* | 8/2013 | Teng | G05D 1/0234 320/107 |
| 2013/0261867 A1* | 10/2013 | Burnett | G05D 1/0272 701/23 |
| 2015/0366129 A1* | 12/2015 | Borinato | A01B 69/008 701/25 |
| 2016/0091899 A1* | 3/2016 | Aldred | G05D 1/0225 701/23 |

\* cited by examiner

AUTONOMOUS WORK DEVICE

This application is a 35 U.S.C. § 371 National Stage Application of PCT/EP2015/062403, filed on Jun. 3, 2015, which claims the benefit of priority to Ser. No. DE 10 2014 212 408.5, filed on Jun. 27, 2014 in Germany, the disclosures of which are incorporated herein by reference in their entirety.

BACKGROUND

An autonomous implement according to the precharacterizing portion of claim 1 has already been proposed.

SUMMARY

The disclosure takes as its starting-point an autonomous implement, in particular an autonomous lawnmower, with at least one orientation device, different from a perimeter-wire orientation device, which is provided for orientation within a processing zone, and with at least one control and/or regulating unit for ascertainment of a travel strategy.

It is proposed that the at least one control and/or regulating unit is provided at least to ascertain an alignment relative to a base station for a targeted docking onto an interface, in particular a charging interface, of the base station in a manner depending on at least one orientation parameter captured by means of the at least one orientation device. The interface may take the form of a charging interface, an auxiliary-material refueling interface or another interface of the base station appearing useful to a person skilled in the art. Particularly preferably in this connection, the interface takes the form of a charging interface of the base station. By "autonomous" in this context is to be understood, in particular, "working on its own". In an operating state, the autonomous implement preferentially performs a task, at least for the most part, independently of any intervention by an operator. In a particularly preferred embodiment, the autonomous implement is provided to begin the task at least partly automatically or to terminate it automatically and/or to select, at least partly automatically, at least one parameter—such as, in particular, a route parameter—and/or a reversing-point etc. Particularly preferably, the autonomous implement is at least partly provided to render at least one service for an operator and/or for people in general. The autonomous implement may preferentially take the form of various autonomous service robots appearing useful to a person skilled in the art, such as, in particular, an autonomous road-sweeping machine, an autonomous vacuum cleaner, an autonomous pool-cleaning machine, an autonomous floor-mopping robot and/or, particularly preferably, an autonomous lawnmower. In principle, however, other autonomous implements appearing useful to a person skilled in the art are also conceivable.

By "provided" is to be understood, in particular, specially configured, designed and/or equipped. By the statement that an object is provided for a particular function, it is to be understood, in particular, that the object performs and/or executes this particular function in at least one application state and/or operating state. By "different from a perimeter-wire orientation device" in this context is to be understood, in particular, at least almost completely independent of a perimeter wire which is preferably provided for a demarcation of the processing zone.

By an "orientation" in this context is to be understood, in particular, a capture of a position and/or of an alignment of the autonomous implement relative to the base station. By an "alignment" in this context is to be understood, in particular, an angle that is included by a direction of travel of the autonomous implement and a docking direction of the base. By a "processing zone" in this context is to be understood, in particular, a zone that defines an area to be processed by the autonomous implement.

By a "control and/or regulating unit" in this context is to be understood, in particular, a unit that is provided at least partly for an active influencing and/or active adaptation and/or change, in particular dynamic change, in particular independent of an operator, of a mode of the autonomous implement, preferentially in accordance with an algorithm. The control and/or regulating unit preferentially includes a processor unit and a memory unit, as well as at least one operating program stored in the memory unit. Furthermore, by a "memory unit" in this context is to be understood, in particular, a unit that is provided to store at least one item of information, advantageously independently of a power supply.

By a "targeted docking" in this context is to be understood, in particular, an approach to the charging interface at least almost along an ideal line. A deviation from the ideal line preferentially amounts to at most 2 cm, and particularly preferably at most 1 cm. By a "base station" in this context is to be understood, in particular, a unit and/or assembly that is designed to be capable of being coupled at least partly, in particular electrically, with the autonomous implement and, at least in a state coupled with the autonomous implement, is provided to charge at least one storage battery of the autonomous implement with electrical energy.

By virtue of the configuration, according to the disclosure, of the autonomous implement, a preferably simple operation and preferably reliable guidance of the autonomous implement in an operating state within the processing zone as well as an advantageously user-friendly installation of the autonomous implement can be achieved.

The at least one orientation parameter captured by means of the at least one orientation device may, in a particularly preferred embodiment, be constituted by a displacement traveled by the autonomous implement in an operating state, in particular by a displacement-capture unit, and/or by an orientation relative to the base station, in particular by a direction-capture unit. By a "displacement traveled" in this context is to be understood, in particular, a distance that the autonomous implement has traveled or driven during a working procedure. The displacement-capture unit may preferentially be provided for an inertial navigation of the autonomous implement. In a particularly preferred embodiment, the displacement-capture unit includes at least one odometer and/or at least one rate-of-turn sensor. However, other configurations of the displacement-capture unit appearing useful to a person skilled in the art are also conceivable. The alignment of the autonomous implement relative to the base station can preferentially be stored locally, and an angle at a start-up of the autonomous implement from the base station can be set to 0°. In the course of the capture of the traveled displacement by the displacement-capture unit by means of the inertial navigation, inaccuracies may arise, for example as a result of slippage, which add up over the increasing displacement traveled. However, these inaccuracies are limited by the limited running-time of the working procedure of the autonomous implement, in particular by the service life of the storage battery, for example to a maximum of 2 m.

In a particularly preferred embodiment, the direction-capture unit is provided at least partly for a global orientation relative to the base station. By an "orientation" in this context is to be understood, in particular, the alignment of the autonomous implement relative to the base station, or the angle that is included by the direction of travel of the autonomous implement and the docking direction of the base station. The direction-capture unit preferentially includes an electronic and/or mechanical compass and/or a GPS-based instrument. However, other configurations of the direction-capture unit appearing useful to a person skilled in the art are also conceivable. The orientation device preferentially includes the direction-capture unit in addition to the displacement-capture unit. However, it is also conceivable that the orientation device includes only the displacement-capture unit, and the direction-capture unit is partly, or preferentially completely, dispensed with.

In a particularly preferred embodiment, the orientation device is provided at least partly, preferentially at least almost completely, for a connectionless guidance of the autonomous implement within the processing zone. Particularly preferably, the orientation device is provided for a connectionless guidance of the autonomous implement into a near zone of the base station. By a "connectionless guidance" in this context, it is to be understood, in particular, that the autonomous implement can be guided toward the base station independently of a communication or of an exchange of data with the base station, and in particular independently of mechanical connecting and/or directing elements such as an induction wire, for example. By a "near zone" in this context is to be understood, in particular, a zone that is arranged, in particular, at most 5 m, preferentially at most 2 m, preferably at most 1 m, and particularly preferably at most 0.5 m, away from the base station, in particular from a charging interface of the base station.

Furthermore, it is proposed that the at least one control and/or regulating unit is provided at least to ascertain an offset d relative to a principal axis of the base station. By an "offset" in this context is to be understood, in particular, a spacing of the autonomous implement, in particular a spacing of a charging interface of the autonomous implement, from the principal axis of the base station, which runs at least almost perpendicular to the principal axis of the base station. The principal axis of the base station is preferentially arranged parallel to a principal entry direction of the autonomous implement for a docking onto the charging interface of the base station, and intersects the charging interface of the base station. As a result, the alignment of the autonomous implement relative to the charging interface of the base station can be achieved in advantageously simple manner and preferably precisely.

In addition, it is proposed that the orientation device includes a transmitting and/or receiving unit which is provided for a communication at least with the base station within a near zone of the base station, the at least one control and/or regulating unit being provided to ascertain the offset d relative to a principal axis of the base station at least partly on the basis of at least one item of information captured by the transmitting and/or receiving unit. By a "communication" in this context is to be understood, in particular, an exchange of data at least between the autonomous implement and the base station in at least one direction. The communication between the autonomous implement and the base station is preferentially designed to be bidirectional. In a particularly preferred embodiment, the transmitting and/or receiving unit is provided for a communication, in particular a wireless communication, at least with the base station, in particular only in the near zone of the base station. By a "near zone" in this context is to be understood, in particular, a zone that, in particular, is arranged at most 5 m, preferentially at most 2 m, preferably at most 1 m, and particularly preferably at most 0.5 m, away from the base station, in particular from a charging interface of the base station. As a result, a preferably reliable guidance of the autonomous implement, in particular in the course of an approach to the base station, can be achieved.

Moreover, it is proposed that the at least one control and/or regulating unit is provided to ascertain the offset d relative to a principal axis of the base station at least partly by a range measurement at at least two points spaced from one another. The range measurement is preferentially achieved at least by means of a measurement of the propagation time of a signal. As a result, a preferably high precision can be achieved in the course of the determination of the offset d.

In addition, it is proposed that the transmitting and/or receiving unit is provided at least for an emission, after reaching the near zone of the base station, of at least one signal that is intended to trigger an emission of at least one response signal by the base station. As a result, an advantageously simple communication with the base station, and consequently a preferably reliable guidance of the autonomous implement to the charging interface of the base station, can be achieved.

Furthermore, it is proposed that the transmitting and/or receiving unit includes at least one ultrasonic element for a communication at least with the base station within the near zone of the base station. By an "ultrasonic element" in this context is to be understood, in particular, an element that is provided for a communication, at least for the most part, by means of ultrasonic waves. The at least one ultrasonic element can preferentially be utilized as an ultrasonic transceiver. In a particularly preferred embodiment, the at least one ultrasonic element takes the form of an ultrasonic park-pilot sensor, in particular manufactured by Robert Bosch GmbH. As a result, an advantageously inexpensive and structurally simple configuration of the transmitting and/or receiving unit can be achieved.

Moreover, it is proposed that the transmitting and/or receiving unit includes at least one ultra-wideband element for a communication at least with the base station within the near zone of the base station. By an "ultra-wideband element" in this context is to be understood, in particular, an element that is provided for a communication, at least for the most part, by means of UWB waves. The at least one ultra-wideband element may take the form, at least partly, of a half-field emitter or of a directional antenna, or may have been designed in another way appearing useful to a person skilled in the art, as a result of which a communication with the base station over a preferably large distance can be achieved. By virtue of the at least one ultra-wideband element, an advantageously flexibly employable and structurally simple configuration of the transmitting and/or receiving unit can be achieved. In addition, through use of a frequency band by the ultra-wideband element a preferably robust method can advantageously be achieved, since no naturally occurring sources of interference are known. The ultra-wideband element can, in addition, be utilized advantageously for a transfer of data. Furthermore, an advantageously high degree of robustness can be achieved in comparison with multi-path routes that may arise by reason of a low sensor height of the transmitting and/or receiving unit.

Furthermore, the disclosure takes as its starting-point a base station with at least one interface, in particular a charging interface, that is designed to be capable of being coupled with an autonomous implement, in particular with an autonomous lawnmower.

It is proposed that the base station exhibits a transmitting and/or receiving unit which is provided for a communication at least with the autonomous implement and which, up until a detection of at least one signal emitted by the transmitting and/or receiving unit of the autonomous implement, is in a receive mode. By a "communication" in this context is to be understood, in particular, an exchange of data at least between the autonomous implement and the base station in at least one direction. The communication between the autonomous implement and the base station is preferentially designed to be bidirectional. In a particularly preferred embodiment, the transmitting and/or receiving unit is provided for a communication, in particular a wireless communication, at least with the base station, in particular only in the near zone of the base station. As a result, a preferably reliable guidance of the autonomous implement, in particular in the course of an approach to the base station, can be achieved.

In addition, it is proposed that the transmitting and/or receiving unit includes at least one ultrasonic element for a communication at least with the autonomous implement. By an "ultrasonic element" in this context is to be understood, in particular, an element that is provided for a communication, at least for the most part, by means of ultrasonic waves. The at least one ultrasonic element can preferentially be utilized as an ultrasonic transceiver. In a particularly preferred embodiment, the at least one ultrasonic element takes the form of an ultrasonic park-pilot sensor, in particular manufactured by Robert Bosch GmbH. As a result, an advantageously inexpensive and structurally simple configuration of the transmitting and/or receiving unit can be achieved.

Moreover, it is proposed that the transmitting and/or receiving unit of the base station includes at least one ultra-wideband element for a communication at least with the autonomous implement. By an "ultra-wideband element" in this context is to be understood, in particular, an element that is provided for a communication, at least for the most part, by means of ultra-wideband waves. The at least one ultra-wideband element may take the form, at least partly, of a half-field emitter or of a directional antenna, or may have been designed in another way appearing useful to a person skilled in the art, as a result of which a communication with the autonomous implement over a preferably large distance and within an advantageously large directional range can be achieved. In this connection, the at least one ultra-wideband element can, for example, be utilized additionally as a marker point for a navigation. By virtue of the at least one ultra-wideband element, an advantageously flexibly employable and structurally simple configuration of the transmitting and/or receiving unit can be achieved.

Furthermore, a system with at least one autonomous implement, in particular with an autonomous lawnmower, and with at least one base station is proposed.

In addition, the disclosure takes as its starting-point a method for a coupling of an autonomous implement, in particular an autonomous lawnmower, with an interface, in particular with a charging interface, of a base station.

In this connection it is proposed that the method includes at least one step in which an alignment relative to a base station is ascertained by means of at least one control and/or regulating unit in a manner depending on at least one item of information captured by an orientation device, different perimeter-wire orientation device, for a targeted docking onto a charging interface of the base station. As a result, a preferably simple operation and a preferably reliable guidance of the autonomous implement in an operating state within the processing zone, as well as an advantageously user-friendly installation of the autonomous implement, can be achieved.

In addition, it is proposed that the method includes at least one step in which an offset d of the autonomous implement relative to a principal axis of the base station is ascertained. As a result, the alignment of the autonomous implement relative to the charging interface of the base station can be achieved in advantageously simple manner and preferably precisely.

Moreover, it is proposed that the method includes at least one step in which a transmitting and/or receiving unit of the autonomous implement emits, after reaching the near zone of the base station, at least one signal that is intended to trigger an emission of at least one response signal by a transmitting and/or receiving unit of the base station after a detection of the at least one signal. As a result, a preferably simple operation, an advantageously reliable and precise guidance of the autonomous implement to the base station and consequently an advantageously high degree of autonomy of the system and a preferably high degree of operator comfort can be achieved.

The autonomous implement according to the disclosure is not intended to be restricted to the application and practical form described above. In particular, for a performance of a mode of operation described herein the autonomous implement according to the disclosure may exhibit a number of individual elements, components and units differing from a number mentioned herein.

BRIEF DESCRIPTION OF THE DRAWINGS

Further advantages arise out of the following description of the drawing. In the drawing, an embodiment of the disclosure is represented. The drawing, the description and the claims contain numerous features in combination. A person skilled in the art will expediently also consider the features individually and will combine them to form further useful combinations.

Shown are.

DETAILED DESCRIPTION

Figure 1:
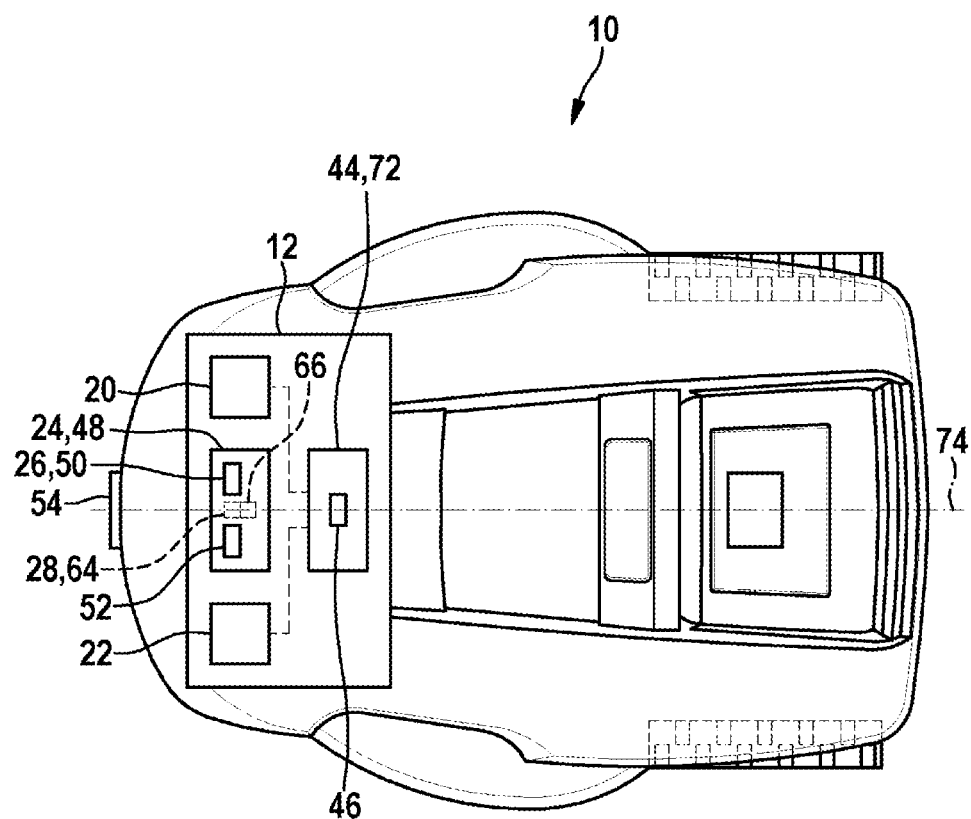
FIG. 1 an autonomous implement with an orientation device in a schematic top view, FIG. 2 a system with a base station and with the autonomous implement during a docking procedure, in a schematic representation, FIG. 3 the system with the base station and with the autonomous implement during a docking procedure, in a further schematic representation, FIG. 4 the system with the base station and with the autonomous implement during a docking procedure, in a further schematic representation and FIG. 5 a schematic block diagram of a method for a coupling of the autonomous implement with the base station.

An autonomous implement 10 is represented schematically in FIG. 1. The autonomous implement 10 takes the form of an autonomous service robot. The autonomous implement 10 takes the form of an autonomous lawnmower. The autonomous implement 10 has been provided to mow a processing zone 14. The processing zone 14 is constituted by a meadow or by a lawn of a garden. In principle, however, it would also be conceivable that the autonomous implement 10 is constituted by a vacuum-cleaner robot or by another service robot appearing useful to a person skilled in the art, and the processing zone 14 is constituted correspondingly, for example by a room. Furthermore, the autonomous implement 10 can also be programmed for several processing zones 14. The various processing zones 14 may in this case be stored separately and, depending on the present location of the autonomous implement 10, selected separately.

The autonomous implement 10 exhibits an orientation device 12, different from a perimeter-wire orientation device, which is provided for an orientation within a processing zone 14. In addition, the orientation device 12 is provided for a connectionless guidance at least into a near zone 16 of a base station 18. The orientation device 18 is provided for a connectionless guidance into the near zone 16 of the base station 18. The orientation device 12 is provided to guide the autonomous implement 10 back to the base station 18 for a charging of a storage battery of the autonomous implement 10 after operation. For this purpose, an orientation of the autonomous implement 10 relative to the base station 18 within the processing zone 14 is captured by means of the orientation device 12 in an operating state.

The autonomous implement 10 further exhibits a control and/or regulating unit 72 for an ascertainment of a travel strategy, which is provided to ascertain an alignment relative to a base station 18 for a targeted docking onto a charging interface 30 of the base station 18 in a manner depending on at least one orientation parameter captured by means of the at least one orientation device 12. The orientation parameter is constituted by an orientation of the autonomous implement 10 relative to the base station 18 and also by a displacement traveled by the autonomous implement 10 in an operating state. The control and/or regulating unit 72 is provided to ascertain an offset d relative to a principal axis 74 of the base station 18. The control and/or regulating unit 72 is provided to ascertain the offset d relative to the principal axis 74 of the base station 18 on the basis of an item of information captured by a transmitting and/or receiving unit 24 of the orientation device 12. The control and/or regulating unit 72 is provided to ascertain the offset d relative to the principal axis 74 of the base station 18 by a range measurement at at least two points spaced from one another.

The orientation device 12 exhibits a direction-capture unit 22 which is provided for the orientation of the autonomous implement 10 relative to the base station 18. The direction-capture unit 22 of the orientation device 12 is provided for a global orientation of the autonomous implement 10. The direction-capture unit 22 of the orientation device 12 includes a GPS element which is not represented. However, it is also conceivable that the direction-capture unit 22 of the orientation device 12 includes, alternatively or additionally, a compass, in particular an electronic or magnetic compass.

The orientation device 12 includes for this purpose a displacement-capture unit 20 which is provided for a capture of the displacement traveled by the autonomous implement 10 in an operating state. The displacement-capture unit 20 of the orientation device 12 is provided for a capture of the distance traveled beginning from a start-up of the autonomous implement 10 from the base station 18. The displacement-capture unit 20 of the orientation device 12 includes at least one acceleration sensor or rate-of-rotation sensor for capturing a linear acceleration or an angular acceleration of the autonomous implement 10 in an operating state. The displacement-capture unit 20 of the orientation device 12 includes several acceleration sensors or rate-of-rotation sensors which are not represented. The displacement-capture unit 20 of the orientation device 12 includes, in addition, an odometric element or an odometer, not represented, for an indirect capture of the distance traveled via a number of revolutions that driving wheels of the autonomous implement 10 execute in an operating state.

The displacement-capture unit 20 and the direction-capture unit 22 of the orientation device 12 of the autonomous implement 10 are provided to capture, in an operating state at any time, a position of the autonomous implement 10 within the processing zone 14 and relative to the base station 18 as well as an angular alignment relative to the base station 18. The orientation device 12 includes a computing unit 44 which is provided for an evaluation of the information of the displacement-capture unit 20 and of the direction-capture unit 22. The displacement-capture unit 20 and the direction-capture unit 22 are each connected to the computing unit 44 for an exchange of data. The displacement-capture unit 20 and the direction-capture unit 22 are each electronically connected to the computing unit 44. The control and/or regulating unit 72 includes the computing unit 44. The computing unit 44 exhibits a filter element 46 which is provided for a filtering and fusion of the information and data captured by the displacement-capture unit 20 and the direction-capture unit 22. The filter element 46 of the computing unit 44 is constituted by a Kalman filter.

The orientation device 12 includes, in addition, the transmitting and/or receiving unit 24 which is provided for a communication at least with the base station 18 within a near zone 16 of the base station 18. The transmitting and/or receiving unit 24 is provided for an emission, after reaching the near zone 16 of the base station 18, of at least one signal that is intended to trigger an emission of at least one response signal by the base station 18. The transmitting and/or receiving unit 24 takes the form of a transmitting and receiving unit 48 and is provided for a communication with the base station 18. The transmitting and receiving unit 48 is provided for a bidirectional communication with the base station 18. The transmitting and receiving unit 48 is provided for a communication with the base station 18 by means of "round trippings". The transmitting and receiving unit 48 exhibits an ultrasonic element 26 for a communication at least with the base station 18 within the near zone 16 of the base station 18. The ultrasonic element 26 is provided to emit ultrasonic waves for the purpose of orientation relative to the base station 18. The ultrasonic element 26 takes the form of an ultrasonic transmitting element 50. The ultrasonic element 26 of the transmitting and receiving unit 48 is provided to emit ultrasonic waves in an unambiguous sequence. The ultrasonic element 26 of the transmitting and receiving unit 48 consequently takes the form of an ultrasonic trigger element. The transmitting and receiving unit 48 of the orientation device 12 exhibits, in addition, an ultrasonic receiving element 52 which is provided to receive ultrasonic waves for the purpose of orientation relative to the base station 18. The ultrasonic element 26 and the ultrasonic receiving element 52 each take the form of an integrated sensor.

The base station 18 and the autonomous implement 10, which is constituted by the autonomous lawnmower, are constituent parts of a system. The base station 18 exhibits the schematically represented charging interface 30 which is designed to be capable of being coupled with the autonomous implement 10. The autonomous implement 10 likewise exhibits for this purpose a charging interface 54 which is designed to correspond with the charging interface 30 of the base station 18. The charging interface 30 of the base station 18 and the charging interface 54 of the autonomous implement 10 take the form of electrical contacts. The base station 18 exhibits a mechanical guide, not represented, which is provided to correspond with the autonomous implement 10 and to direct the autonomous implement 10 in the course of a procedure for docking onto the charging interface 30 of the base station 18, in order to facilitate the docking.

The base station 18 exhibits, in addition, a transmitting and/or receiving unit 32 which is provided for a communication at least with the autonomous implement 10 and which, up until a detection of a signal emitted by the transmitting and/or receiving unit 24 of the autonomous implement 10, is in a receive mode. The transmitting and/or receiving unit 32 of the base station 18 takes the form of a transmitting and receiving unit 56 and is provided for a communication with the autonomous implement 10. The transmitting and receiving unit 56 is provided for a bidirectional communication with the autonomous implement 10. The transmitting and receiving unit 56 exhibits an ultrasonic element 34. The ultrasonic element 34 of the transmitting and receiving unit 56 of the base station 18 is provided to emit ultrasonic waves for the purpose of orientation of the autonomous implement 10 relative to the base station 18. The ultrasonic element 34 of the transmitting and receiving unit 56 of the base station 18 takes the form of an ultrasonic transmitting element 58. The ultrasonic element 34 of the transmitting and receiving unit 56 of the base station 18 is provided to emit ultrasonic waves in an unambiguous sequence by way of response signal. The ultrasonic element 34 of the transmitting and receiving unit 56 of the base station 18 consequently takes the form of an ultrasonic trigger element. The transmitting and receiving unit 56 of the base station 18 exhibits, in addition, an ultrasonic receiving element 60 which is provided to receive ultrasonic waves for the purpose of orientation of the autonomous implement 10 relative to the base station 18. The ultrasonic element 34 and the ultrasonic receiving element 60 of the transmitting and receiving unit 56 of the base station 18 each take the form of an integrated sensor. The ultrasonic elements 26, 34 and the ultrasonic receiving elements 52, 60 are designed to correspond. The ultrasonic elements 26, 34 and the ultrasonic receiving elements 52, 60 are provided for a communication by means of ultrasonic waves.

Alternatively, it is also conceivable that the transmitting and/or receiving unit 24 of the autonomous implement 10 includes an ultra-wideband element 28 for a communication at least with the base station 18 within the near zone 16 of the base station 18, which may replace the ultrasonic element 26 already described (represented by dashes). In addition, it is also conceivable that the transmitting and/or receiving unit 32 of the base station 18 includes an ultra-wideband element 36 for a communication at least with the autonomous implement 10, which replaces the ultrasonic element 34 already described (represented by dashes). However, it is also conceivable that the transmitting and/or receiving unit 24 of the autonomous implement 10 and/or the transmitting and/or receiving unit 32 of the base station 18 include(s) both at least one ultra-wideband element 28, 36 and at least one ultrasonic element 26, 34 and/or another element, in particular an acoustic element, appearing useful to a person skilled in the art. The ultra-wideband elements 28, 36 are designed to correspond. The ultra-wideband elements 28, 36 are provided for a communication by means of radio waves. The ultra-wideband elements 28, 36 are provided to emit radio waves in a frequency range between 3.1 GHz and 10.6 GHz. The ultra-wideband elements 28, 36 are provided to emit the radio waves as pulses. The ultra-wideband elements 28, 36 take the form of UWB transmitting elements 62, 64. The transmitting and/or receiving unit 24 of the autonomous implement 10 and/or the transmitting and/or receiving unit 32 of the base station 18 may, in addition, each include an ultra-wideband receiving element 66, 68 which is provided for a reception of the radio waves emitted by the ultra-wideband elements 28, 36.

In an operating state of the autonomous implement 10 the respective position of the autonomous implement 10 relative to the base station 18 is ascertained indirectly by means of the displacement-capture unit 20 and the direction-capture unit 22 of the orientation device 12. After a working procedure of the autonomous implement 10, the autonomous implement 10 is to return to the base station 18 and, for a recharging of the storage battery of the autonomous implement 10 with the charging interface 54, is to dock at the charging interface 30 of the base station 18. In the course of a docking of the autonomous implement 10 at the base station 18, an accuracy from 1 cm to 2 cm is required.

Figure 5:
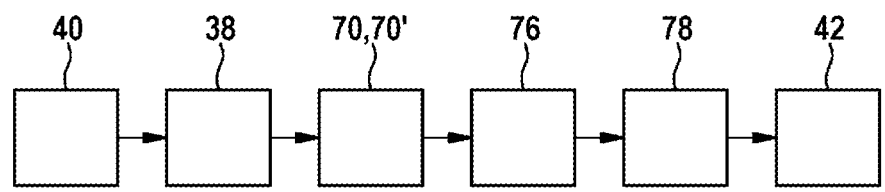

For this purpose, a method is provided for coupling the autonomous implement 10, which is constituted by the autonomous lawnmower, with the charging interface 30 of the base station 18 (FIG. 5). The method has a step 40 in which the alignment of the autonomous implement 10 relative to the base station 18 is ascertained by means of the control and/or regulating unit 72 in a manner depending on the item of information captured by an orientation device 12, different perimeter-wire orientation device, for the purpose of targeted docking onto the charging interface 30 of the base station 18. Step 40 is provided for the orientation of the autonomous implement 10 and for the capture of the position of the autonomous implement 10 relative to the base station 18 in the operating state or during the working procedure of the autonomous implement 10 at least partly by means of a displacement-capture unit 20 and/or a direction-capture unit 22 of the orientation device 12 of the autonomous implement 10. In step 40 the orientation and the position of the autonomous implement 10 relative to the base station 18 within the near zone 16 of the base station 18 are ascertained by means of the displacement-capture unit 20 and the direction-capture unit 22 of the orientation device 12 of the autonomous implement 10.

The method has a step 38 in which, after the working procedure, the autonomous implement 10 is brought into the near zone 16 of the base station 18 by means of at least one item of information of the orientation device 12. The autonomous implement 10 is guided in step 38 into the near zone 16 of the base station 18 on the basis of the position of the autonomous implement 10 ascertained by means of the direction-capture unit 22 and the displacement-capture unit 20 of the orientation device 12. This happens independently of a communication between the base station 18 and the autonomous implement 10. During step 38 and step 40 there is no communicative connection between the base station 18 and the autonomous implement 10.

Figure 2:
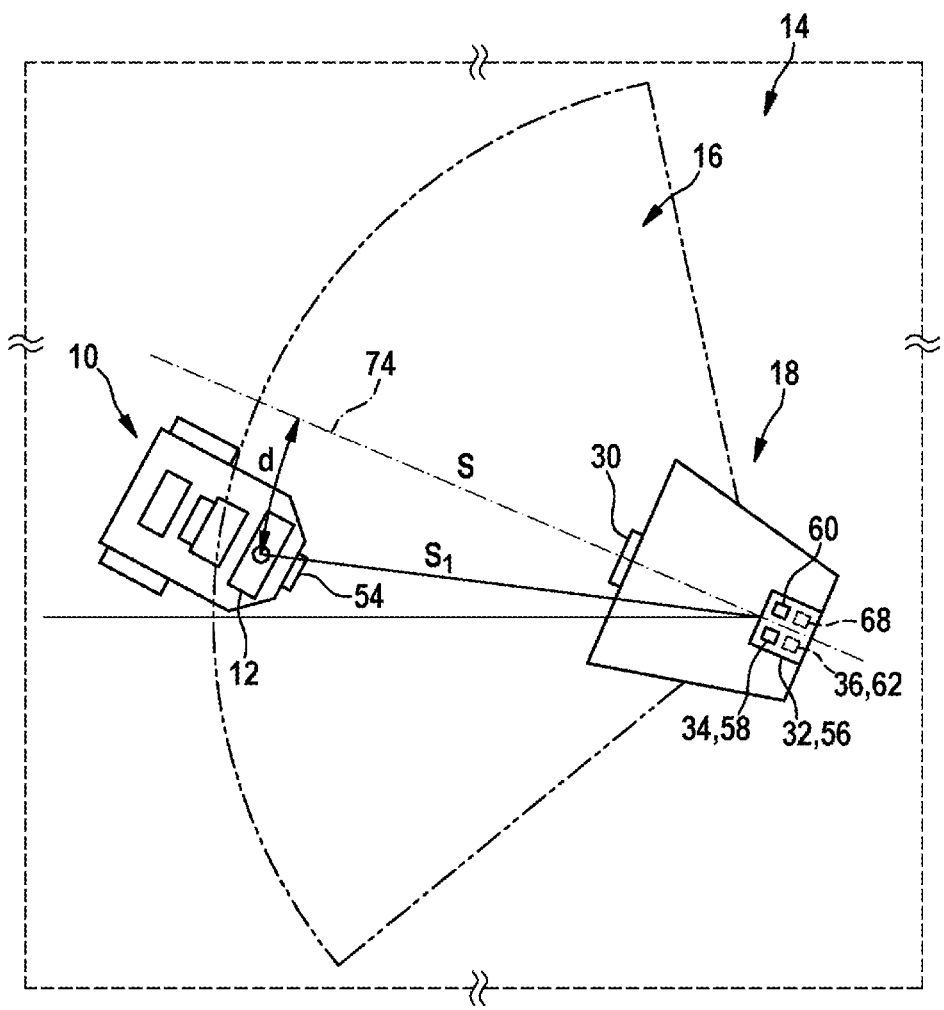

For this purpose, the direction-capture unit 22 of the orientation device 12 captures the orientation of the autonomous implement 10 relative to the base station 18, and the displacement unit 20 of the orientation device 12 captures the position of the autonomous implement 10 relative to the base station 18. For a return of the autonomous implement 10 to the base station 18 after a working procedure, the autonomous implement 10 drives into the near zone 16 of the base station 18, which is calculated by the computing unit 44 by means of the information and data of the displacement-capture unit 20 and of the direction-capture unit 22. The autonomous implement 10 drives into the near zone 16 of the base station 18 in such a way that the autonomous implement 10 is remote from the transmitting and receiving unit 56 of the base station 18 by a calculated distance s. This position can be calculated with the aid of the direction-capture unit 22 of the orientation device 12 (FIG. 2). In addition, the autonomous implement 10 drives into the near zone 16 of the base station 18 in such a way that the ultrasonic element 36 of the transmitting and receiving unit 48 of the autonomous implement 10 is aligned with respect to the ultrasonic element 34 of the transmitting and receiving unit 56 of the base station 18. As a result, an omnidirectional configuration of the ultrasonic element 26 of the transmitting and receiving unit 48 of the autonomous implement 10 and of the ultrasonic element 34 of the transmitting and receiving unit 56 of the base station 18 can be dispensed with. For this purpose, an aperture angle of the ultrasonic element 26 of the transmitting and receiving unit 48 of the autonomous implement 10 and of the ultrasonic element 34 of the transmitting and receiving unit 56 of the base station 18 can be limited mechanically, as a result of which, for example, echoes from a floor or ground of the processing zone 14 can be diminished or preferentially prevented.

In order to be able to determine the exact position of the autonomous implement 10 relative to the base station 18 within the near zone 16 of the base station 18, in a further step 70 a communicative connection between the base station 18 and the autonomous implement 10 is established by means of the transmitting and receiving unit 56 of the base station 18 and the transmitting and receiving unit 48 of the autonomous implement 10. For this purpose, the method has a step 76 in which the offset d of the autonomous implement 10 relative to the principal axis 74 of the base station 18 is ascertained. In this step, the ultrasonic element 26 of the autonomous implement 10 emits the signal consisting of the defined sequence of ultrasonic waves. The signal comprises, for example, two defined sequences of ultrasonic signals with an interval of 100 ms. The defined sequence of ultrasonic signals, which the ultrasonic element 26 of the autonomous implement 10 emits, has been chosen in such a way that there is no overlap with signals in an operating state of the autonomous implement 10, and consequently an unambiguous assignment can be achieved. As a result, the transmitting and receiving unit 48 of the autonomous implement 10 can be utilized additionally for a detection of obstacles in an operating state of the autonomous implement 10, without risking a confusion. As an alternative or in addition to the acoustic ultrasonic signals, it is also conceivable to use a trigger signal, for example consisting of radio waves, for the purpose of locating the base station 18.

For this purpose, the method has a step 78 in which the transmitting and/or receiving unit 24 of the autonomous implement 10 emits, after reaching the near zone 16 of the base station 18, the signal that is intended to trigger the emission of the response signal by the transmitting and/or receiving unit 32 of the base station 18 after a detection of the signal. As soon as the ultrasonic receiving element 60 of the transmitting and receiving unit 56 of the base station 18 receives the defined and unambiguous sequence of ultrasonic signals of the transmitting and receiving unit 48 of the autonomous implement 10, the ultrasonic element 34 of the transmitting and receiving unit 56 of the base station 18 sends back a likewise defined and unambiguous sequence of ultrasonic signals. The defined and unambiguous sequence of ultrasonic signals of the transmitting and receiving unit 48 of the autonomous implement 10 and the defined and unambiguous sequence of ultrasonic signals of the transmitting and receiving unit 56 of the base station 18 are of identical design. However, it is also conceivable that the sequences of ultrasonic signals of the transmitting and receiving unit 56 of the base station 18 and of the transmitting and receiving unit 48 of the autonomous implement 10 are different and designed in another way appearing useful to a person skilled in the art.

If the ultrasonic receiving element 52 of the transmitting and receiving unit 48 of the autonomous implement 10 does not receive the defined and unambiguous sequence of ultrasonic signals of the ultrasonic element 34 of the transmitting and receiving unit 56 of the base station 18, the autonomous implement 10 is not located in the near zone 16 of the base station 18. The autonomous implement 10 starts a finding routine and drives into an adjacent position, emits the defined and unambiguous sequence of ultrasonic signals again and waits for a reception of the defined and unambiguous sequence of ultrasonic signals of the transmitting and receiving unit 56 of the base station 18. This procedure is repeated until such time as the ultrasonic receiving element 52 of the transmitting and receiving unit 48 of the autonomous implement 10 receives the sequence of ultrasonic signals of the transmitting and receiving unit 56 of the base station 18.

By virtue of the reception of the defined and unambiguous sequence of ultrasonic signals of the transmitting and receiving unit 56 of the base station 18 by the ultrasonic receiving element 52 of the transmitting and receiving unit 48 of the autonomous implement 10, it can be confirmed that the autonomous implement 10 is actually positioned in the calculated near zone 16 of the base station 18, and an actual position of the base station 18 relative to the autonomous implement 10 can be determined.

Figure 3:
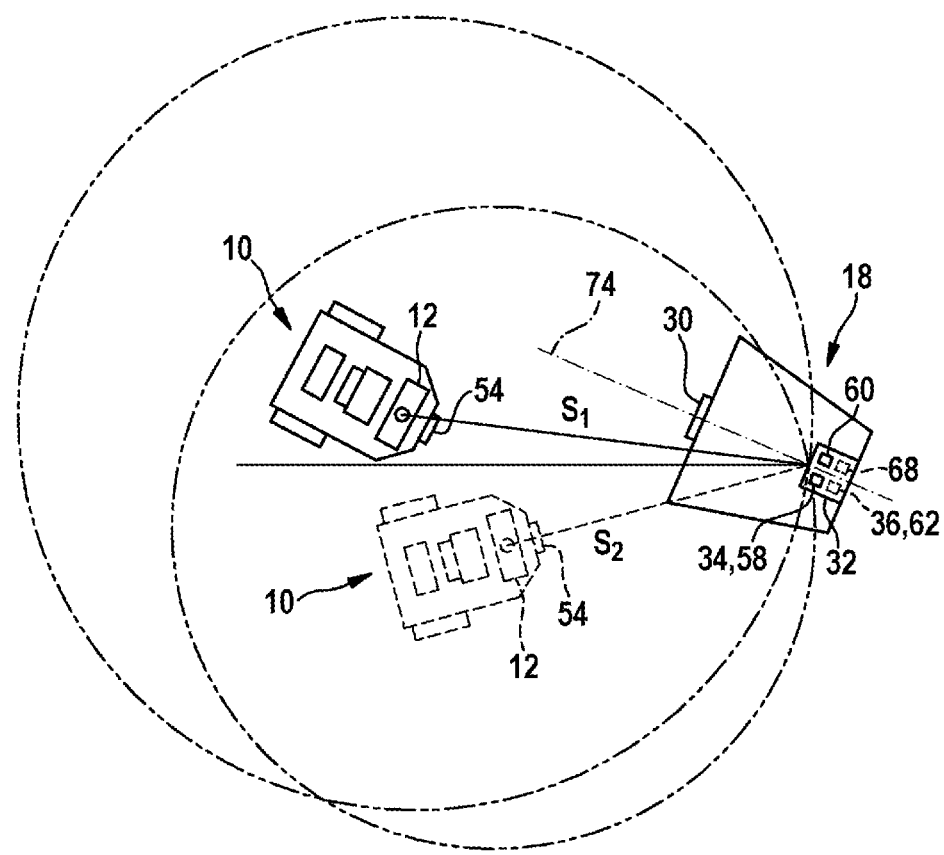

By virtue of a measurement of a propagation time of the ultrasonic signals between an emission and a reception of the defined and unambiguous sequence of ultrasonic signals by the ultrasonic element 26 and by the ultrasonic receiving element 52 of the transmitting and receiving unit 48 of the autonomous implement 10 in the further step 70, and also by virtue of the knowledge of the speed of sound in air, an actual distance $s_1$ between the autonomous implement 10 and the transmitting and receiving unit 56 of the base station 18 can be determined. As a result, both a range between the autonomous implement 10 and the base station 18 and also the position and the orientation of the autonomous implement 10 relative to the base station 18 are known. Now, in order to be able to ascertain the offset d perpendicular to the principal axis 74 of the base station 18, which arises by virtue of an inaccuracy of the position calculated by the displacement-capture unit 20, the autonomous implement 10 drives into another position relative to the base station 18 within the near zone 16 of the base station 18 (FIG. 3, represented by dashes). This other position of the autonomous implement 10 may exhibit an offset, which may be different from the offset d, perpendicular to the principal axis 74 of the base station 18. The other position of the autonomous implement 10 is calculated with the aid of an inertial navigation of the displacement-capture unit 20.

Figure 4:
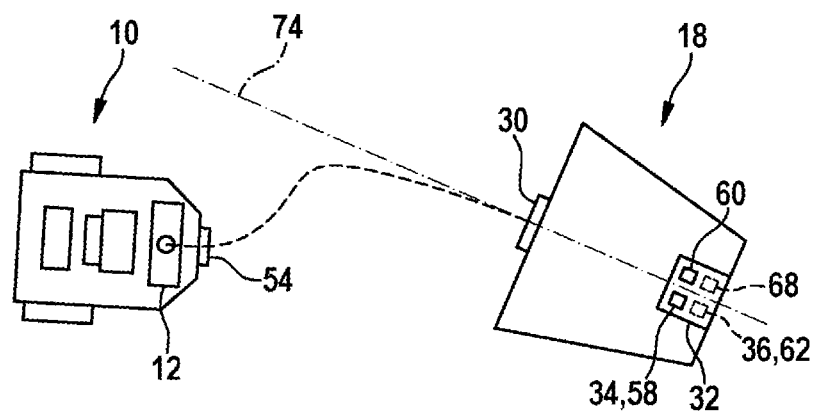

In the other position, the method described above for ascertaining the range $s_2$ between the autonomous implement 10 and the transmitting and receiving unit 56 of the base station 18 is carried out again. For the ascertainment of the range $s_2$ between the autonomous implement 10 and the transmitting and receiving unit 56 of the base station 18, a small change in the position of the autonomous implement 10 is sufficient. A point of intersection of a circle with radius $s_1$ around the autonomous implement 10 in the first position and a point of intersection of a circle with radius $s_2$ around the autonomous implement 10 in the other position, which lies ahead of the autonomous implement 10, identifies the position of the ultrasonic element 34 of the transmitting and receiving unit 56 of the base station 18 (FIG. 3). In order to be able to achieve a higher accuracy in the determination of the base station 18 relative to the autonomous implement 10, the ranges between the autonomous implement 10 and the transmitting and receiving unit 56 of the base station 18 can also be determined at more than two positions. The measurements can be combined by a sensor fusion, for example with the filter element 46, constituted by the Kalman filter, of the computing unit 44, or by a beam adjustment. On the basis of the position, determined in this way, of the base station 18, an approach path for the docking of the autonomous implement 10 at the base station 18 is now calculated (FIG. 4).

The sensor fusion for determining the position of the base station 18 continues to be carried out during the approach of the autonomous implement 10 to the base station 18, so that the approach path for the docking of the autonomous implement 10 at the base station 18 can be recalculated and, where appropriate, corrected. For this purpose, the method for coupling the autonomous implement 10 with the charging interface 30 of the base station 18 has a further step 42 in which the autonomous implement 10 is guided, with the aid of the transmitting and/or receiving unit 24 of the autonomous implement 10, which takes the form of a transmitting and receiving unit 48, and with the aid of the transmitting and/or receiving unit 32 of the base station 18, which takes the form of a transmitting and receiving unit 56, from the near zone 16 of the base station 18 to the charging interface 30 of the base station 18. The calculation and correction of the approach path is calculated by the computing unit 44 of the autonomous implement 10 in a manner known to a person skilled in the art.

If the transmitting and receiving unit 48 of the autonomous implement 10 and the transmitting and receiving unit 56 of the base station 18 exhibit, instead of the ultrasonic element 26, 34, alternatively the already described UWB element 28, 36, respectively, in the further step 70', which corresponds for the most part to the further step 70 already described, the autonomous implement 10 emits a UWB pulse. If the UWB receiving element 68 of the base station 18 receives the UWB pulse of the UWB element 28 of the autonomous implement 10, the UWB element 36 of the base station 18 sends back, after a defined time-interval, a UWB pulse which is received by the UWB receiving element 66 of the autonomous implement 10 arranged in the near zone 16 of the base station 18. By virtue of a measurement of a propagation time of the UWB pulses between an emission and a reception of the UWB pulses by the UWB element 28 and the UWB receiving element 66 of the transmitting and receiving unit 48 of the autonomous implement 10 in the further step 70', and also by virtue of the knowledge of the defined time-interval between a reception and an emission of the UWB pulses by the UWB element of the transmitting and receiving unit of the base station, an actual distance $s_1$ between the autonomous implement 10 and the transmitting and receiving unit 56 of the base station 18 can be determined.

Alternatively, it is also conceivable that the transmitting and/or receiving unit 24 of the autonomous implement 10 and/or the transmitting and/or receiving unit 32 of the base station 18 each include two or more ultrasonic elements 26, 34 or UWB elements 28, 36, so that the relevant parameters for orienting the autonomous implement 10 within the processing zone 14 can be ascertained by a triangulation.

If the wrong one of the two points of intersection of the circles with radii $s_1$ and $s_2$ was selected, this is revealed, at the latest, in the course of the approach of the autonomous implement 10 to the base station 18, and the approach path for the docking of the autonomous implement 10 at the base station 18 is recalculated from the other point of intersection, and the approach of the autonomous implement 10 to the base station 18 is accomplished on the basis of this approach path. If more than two measurements of the ranges between the autonomous implement 10 and the transmitting and receiving unit 56 of the base station 18 are carried out, the choice of the wrong point of intersection is established already in the course of the third measurement of the ranges between the autonomous implement 10 and the transmitting and receiving unit 56 of the base station 18, since the distance of the autonomous implement 10 from the transmitting and receiving unit 56 of the base station 18 increases.

The invention claimed is:

1. An autonomous implement, comprising:
   at least one orientation device configured to provide an orientation of the autonomous implement within a processing zone, wherein the at least one orientation device is not a perimeter-wire orientation device, and the processing zone is outside of a near zone located near a base station; and
   at least one control and regulating unit configured to ascertain a travel strategy for guiding the autonomous implement to the base station when the autonomous implement is located in the near zone,
   wherein the at least one orientation device is configured to capture at least one item of information emitted by the base station, the at least one item of information corresponding to a location of a principal axis extending parallel to an entry direction of the autonomous implement for docking onto an interface of the base station,
   wherein the at least one control and regulating unit is configured to ascertain an alignment of the autonomous implement relative to the base station for a targeted docking onto the interface of the base station based on the at least one item of information captured using the at least one orientation device, and
   wherein the at least one control and regulating unit is configured to ascertain an offset of the autonomous implement relative to the principle axis of the base station, the offset corresponds to a distance between the autonomous implement and the principle axis.

2. The autonomous implement as claimed in claim 1, wherein the at least one control and regulating unit is configured to ascertain the offset relative to the principal axis of the base station at least partly by a range measurement at at least two points spaced from one another.

3. The autonomous implement as claimed in claim 1, wherein the transmitting and receiving unit is configured at least for an emission, after reaching the near zone of the base station, of at least one signal configured to trigger an emission of at least one response signal by the base station.

4. The autonomous implement as claimed in claim 1, wherein the transmitting and receiving unit includes at least one of (i) at least one ultrasonic element and (ii) at least one ultra-wideband element for a communication at least with the base station within the near zone of the base station.

5. The autonomous implement as claimed in claim 1, wherein the autonomous implement is an autonomous lawnmower.

6. The autonomous implement as claimed in claim 1, wherein the interface is a charging interface.

7. An autonomous work system, comprising:
an autonomous implement including (i) at least one orientation device configured to provide an orientation within a processing zone located outside of a near zone, and (ii) at least one control and regulating unit configured to ascertain a travel strategy; and
a base station located in the near zone and including at least one interface configured to be coupled with the autonomous implement, the base station configured to emit at least one item of information corresponding to a location of a principal axis extending from the at least one interface,
wherein the travel strategy is for guiding the autonomous implement to the base station when the autonomous implement is located in the near zone,
wherein the at least one orientation device is configured to capture the at least one item of information emitted by the base station,
wherein the at least one orientation device is not a perimeter-wire orientation device, and
wherein the at least one control and regulating unit is configured to ascertain an alignment of the autonomous implement relative to the base station for a targeted docking onto the at least one interface of the base station based on the at least one item of information captured using the at least one orientation device.

8. The autonomous work system as claimed in claim 7, the base station further comprising:
a transmitting and receiving unit configured to provide a communication at least with the autonomous implement and further configured to be in a receive mode up until a detection of at least one signal emitted by the transmitting and receiving unit of the autonomous implement.

9. The autonomous work system as claimed in claim 8, wherein the transmitting and receiving unit includes at least one of (i) at least one ultrasonic element and (ii) at least one ultra-wideband element configured to communicate at least with the autonomous implement.

10. The autonomous work system as claimed in claim 7, wherein the interface is a charging interface.

11. The autonomous work system as claimed in claim 7, wherein the autonomous implement is an autonomous lawnmower.

12. A method for a coupling of an autonomous implement with an interface of a base station, the method comprising:
transmitting at least one item of information from the base station to the autonomous implement corresponding to a location of a principal axis, the principle axis extending parallel to an entry direction of the autonomous implement for docking onto an interface of the base station;
capturing the transmitted at least one item of information with an orientation device of the autonomous implement;
ascertaining an alignment of the autonomous implement relative to the principal axis of the base station using at least one control and regulating unit of the autonomous implement based on the captured at least one item of information for a targeted docking onto the interface of the base station; and
ascertaining an offset of the autonomous implement relative to the principle axis of the base station,
wherein the orientation device is not a perimeter-wire orientation device and the interface is a charging interface, and
wherein the offset corresponds to a distance between the autonomous implement and the principle axis.

13. The method as claimed in claim 12, further comprising:
guiding the autonomous implement with a GPS element of a direction-capture unit of the autonomous implement when the autonomous implement is outside of a near zone that is located near the base station;
emitting, using a transmitting and receiving unit of the autonomous implement, after reaching the near zone of the base station, at least one signal configured to trigger an emission of at least one response signal by a transmitting and receiving unit of the base station after detection of the at least one signal; and
guiding the autonomous implement based on the ascertained offset when the autonomous vehicle is located in the near zone.

14. The method as claimed in claim 12, wherein the autonomous implement is an autonomous lawnmower.

* * * * *